United States Patent [19]
Reynolds

[11] 3,964,768
[45] June 22, 1976

[54] HITCH ASSEMBLIES

[76] Inventor: Donald F. Reynolds, 4415 E. Textile Road, Ypsilanti, Mich. 48197

[22] Filed: Feb. 14, 1975

[21] Appl. No.: 550,164

[52] U.S. Cl. .................................. 280/495
[51] Int. Cl.² ................................. B60D 1/00
[58] Field of Search .................... 280/495, 496

[56] References Cited
UNITED STATES PATENTS

| | | | |
|---|---|---|---|
| 2,635,891 | 4/1953 | Cook | 280/495 |
| 2,639,160 | 5/1953 | Studebaker | 280/495 |
| 2,747,892 | 5/1956 | Jones | 280/495 |
| 2,889,155 | 6/1959 | Sandage | 280/495 |
| 3,463,514 | 8/1969 | Warner | 280/495 |

*Primary Examiner*—Robert R. Song
*Attorney, Agent, or Firm*—Olsen and Stephenson

[57] ABSTRACT

Apparatus for hitching a trailer to a towing vehicle in which the hitch apparatus is mounted on the frame of the towing vehicle so as to provide optimum load distribution of the trailer on the towing vehicle frame and thereby on the wheels of the towing vehicle.

10 Claims, 6 Drawing Figures

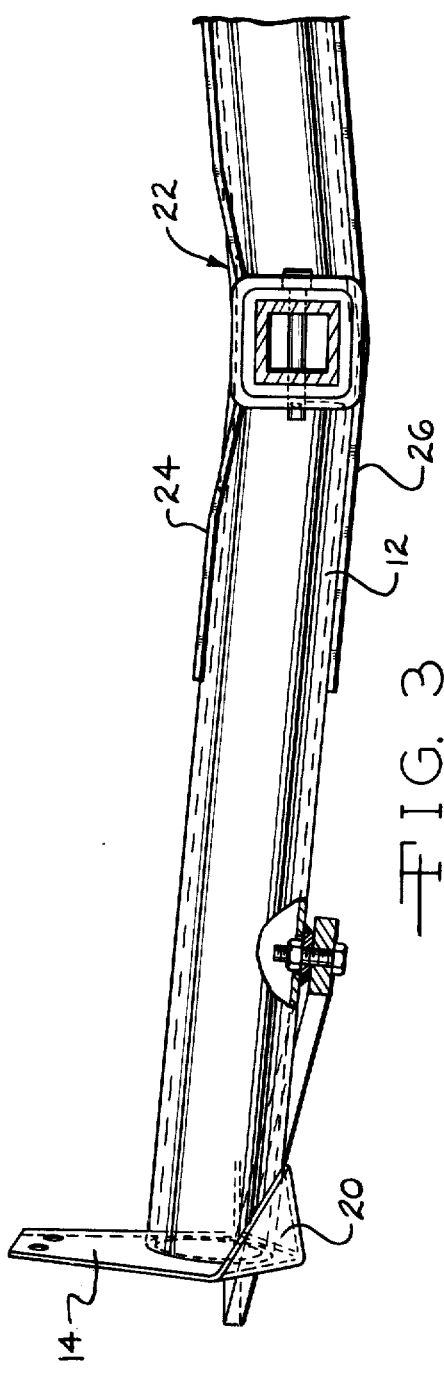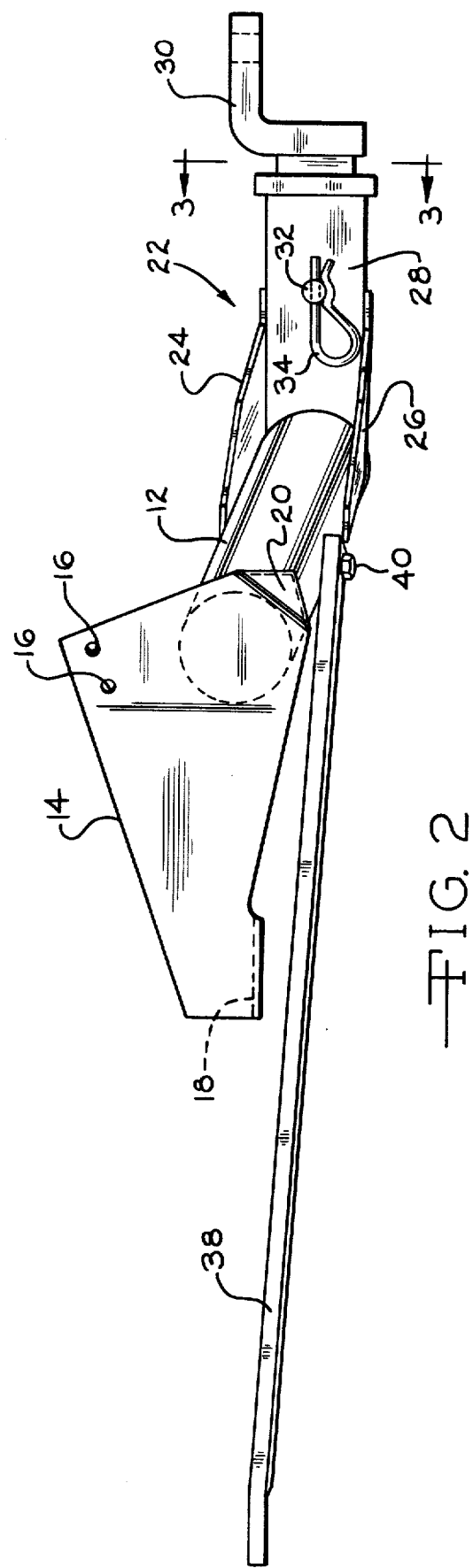

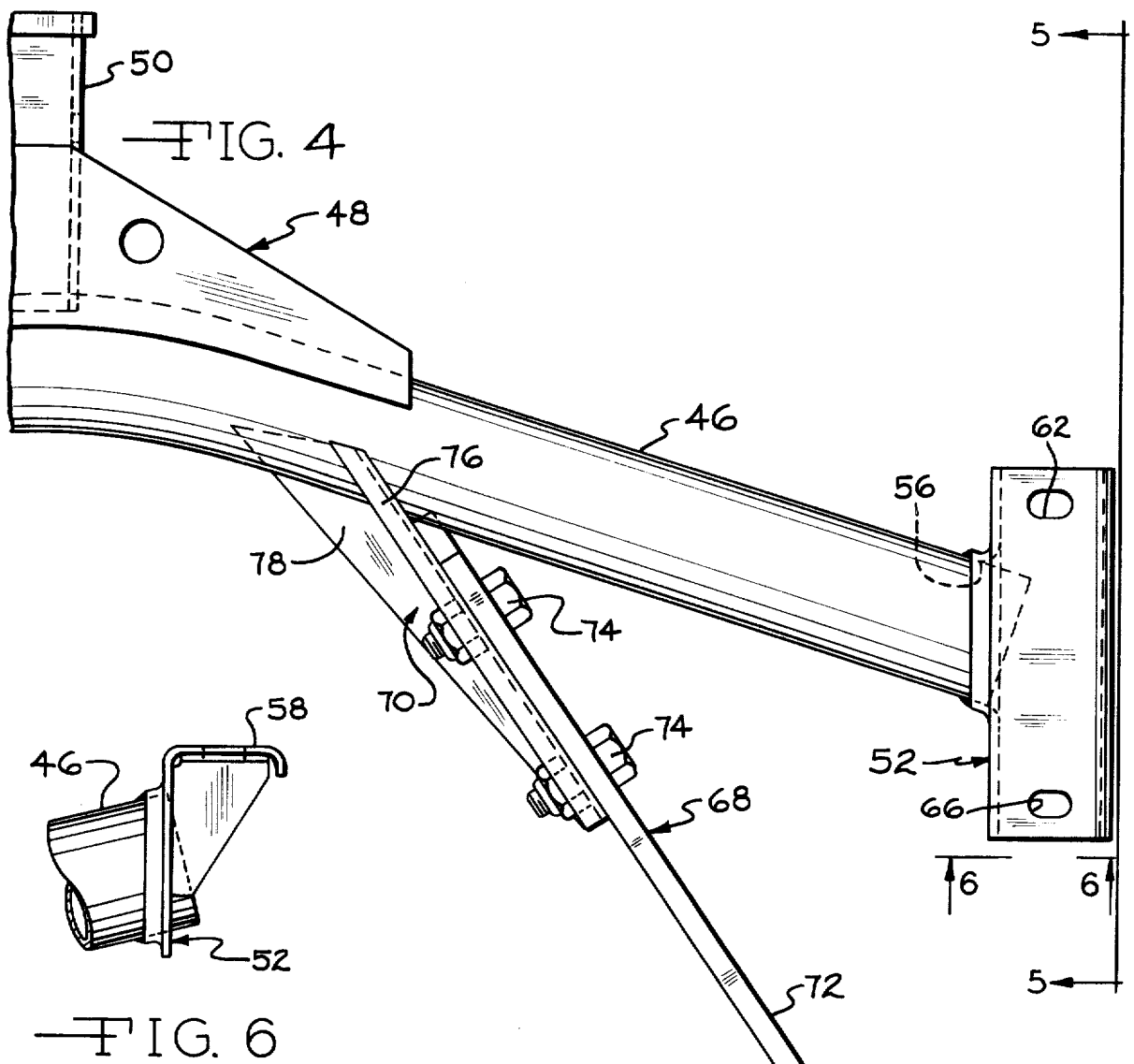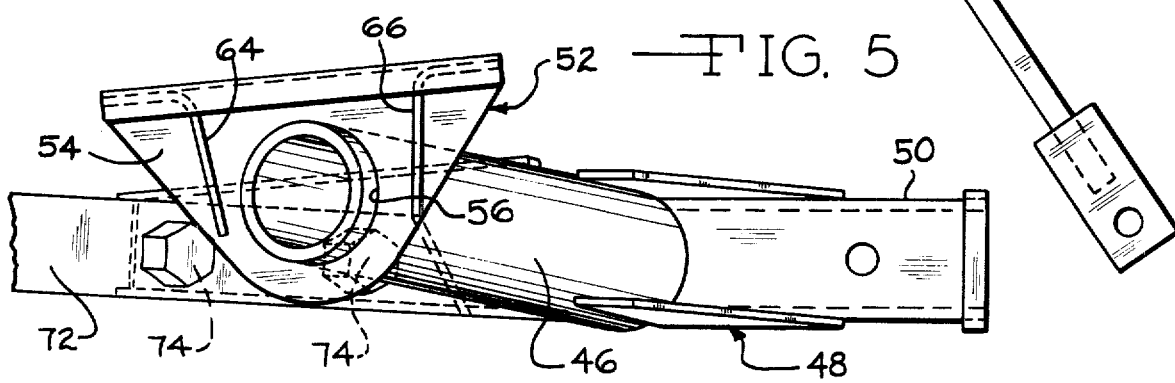

HITCH ASSEMBLIES

BACKGROUND OF THE INVENTION

The present invention relates to improvements in trailer hitches, and particularly to a frame hitch which is constructed and arranged to distribute the load imposed on the hitch in an optimum manner to the frame of the towing vehicle.

In particular, the present invention relates to improvements in hitches of the type disclosed in U.S. Pat. No. 3,578,358, issued May 11, 1971 to Donald F. Reynolds. It is now a common practice to provide a trailer with load equalizer apparatus that is designed to be coupled to a frame hitch of a towing vehicle and by means of leverage applied to both the trailer and the towing vehicle to distribute between the towing vehicle and the trailer the vertical load imposed at the hitch and trailer coupling connection. It is desired that the towing vehicle thus loaded should retain a level position with respect to the road. The frame hitches comprising the prior art do not always fully satisfy these needs from the standpoint of safety, weight, load distribution and the like.

SUMMARY OF THE INVENTION

The present invention provides a frame hitch that is an improvement over the prior art in that it transmits load distribution to the frame of the towing vehicle in a most effective manner, and it is characterized by its relatively light weight commensurate with its load-transmitting characteristics, and the minimal obstruction that it creates beneath the towing vehicle and its capacity to provide other favorable safety features during operation.

According to one form of the present invention, a frame hitch is provided which has a tubular transverse support member, and end plates are mounted on oposite ends of the transverse support member, each plate extending upward and forward of the transverse support member and having means at the upper and forward ends for mounting it on one or the other side of a motor vehicle frame so that the transverse member is positioned to the rear and below said frame. Tension arms are secured at their after ends to the underside of the transverse support member between the opposite ends and the transverse center thereof. The tension arms are relatively long and have means at their forward ends for securing them to the opposite sides of the vehicle frame forward of the mountings of the end plates. A hitch platform including a female hitch receptacle is mounted on the transverse support member at the transverse center thereof. The hitch platform comprises two generally triangular platform plates mounted on the upper and lower surfaces of the transverse support member with the apex of each triangle extending rearwardly. The female hitch receptacle is secured between the platform plates and has an open end to the rear of the platform plates for receiving a drawbar. The upper platform plate has safety chain holes located on opposite sides for receiving the ends of safety chains. In addition, the end plates have tabs deflected out of the plane of the plate to a position where they are integrally secured to the transverse support member. By virtue of the construction and arrangement of the various components of the frame hitch the forces transmitted will be distributed in the most desirable manner to the frame of the vehicle. This is accomplished by structural members of the frame hitch which are of minimum weight commensurate with their load-carrying capacity and which are located in positions to carry out this purpose in the most effective manner.

Thus, it is an object of the present invention to provide an improved hitch assembly for use in towing trailers.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 2 is a side elevational view of the frame hitch;

FIG. 3 is a fragmentary sectional view taken on the line 3—3 of FIG. 2;

FIG. 4 is a fragmentary top plan view showing another form of a frame hitch embodying the present invention;

FIG. 5 is a fragmentary side elevational view taken on the line 5—5 of FIG. 4; and FIG. 6 is a fragmentary elevational view taken on the line 6—6 of FIG. 4.

DESCRIPTION OF THE PREFERRED EMBODIMENT

Figure 1:
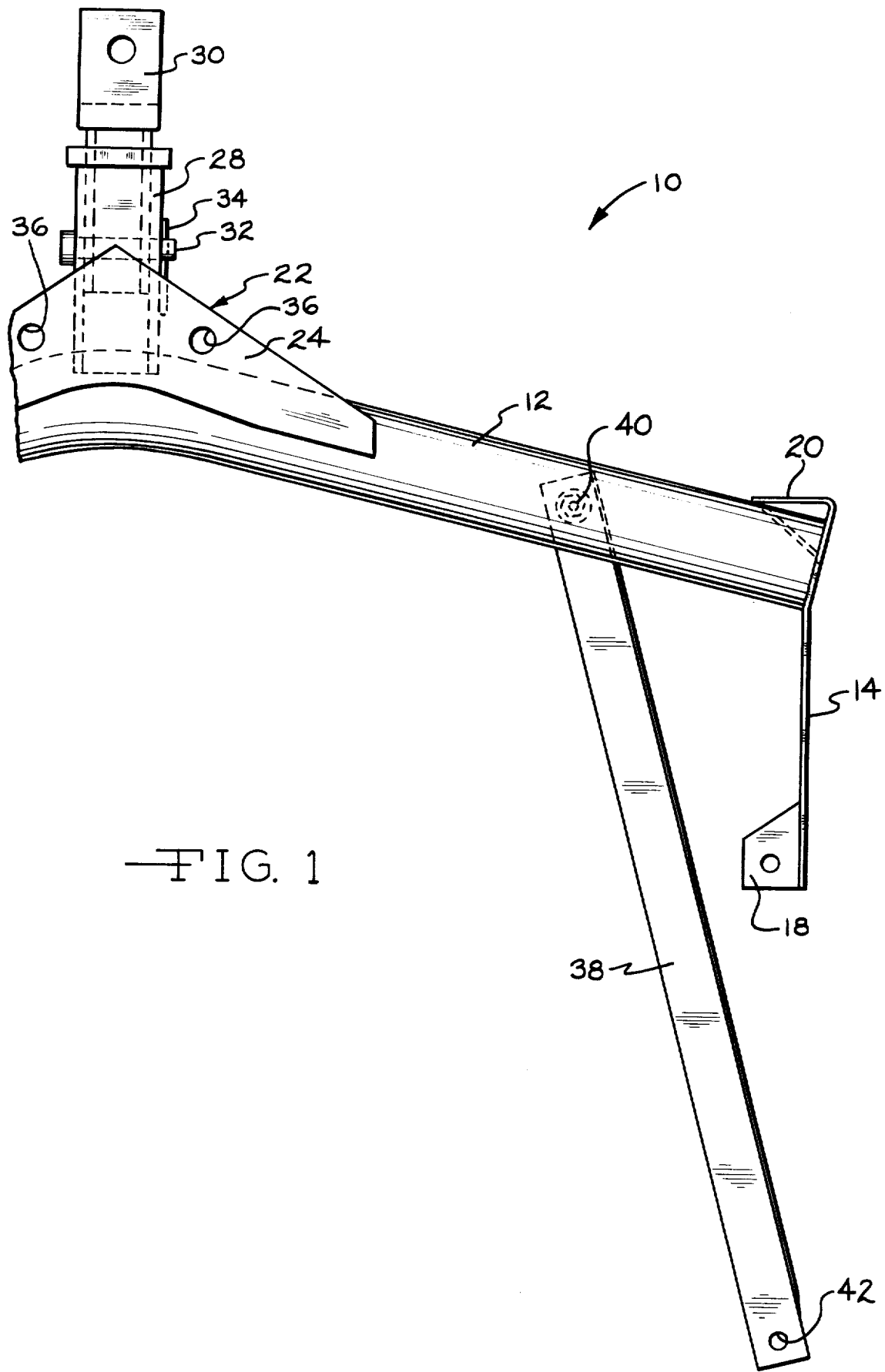
FIG. 1 is a fragmentary top plan view showing one form of a frame hitch embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the terminology employed herein is for the purpose of description and not limitation.

Referring now to the drawings, the invention will be described in greater detail. The frame hitch or hitch assembly 10 includes a tubular transverse support member 12 which has end plates 14, only one of which is shown, suitably secured, as by welding, to the opposite ends of the transverse support member 12. Since the plates 14 are essentially the same, only one is illustrated and only one will be described in detail. The plate 14 extends upward above and forward of the transverse support member 12 as can be seen best in FIG. 2, and it has suitable means at the upper and forward ends for mounting it on the side of a motor vehicle frame with the transverse member 12 positioned to the rear and below the vehicle frame. In the illustrated embodiment these means comprise the bolt holes 16 and the bracket 18. When forming the plate 14 a tab 20 is deflected out of the plane of the plate 14 substantially at right angles thereto for fitting against the wall of the transverse support member 12 and for being welded thereto. This arrangement is found to be very effective for providing a strong connection between the end plate 14 and the transverse support member 12 and to aid in accommodating the tortional forces transmitted through the transverse support member 12 and plate 14 to the frame of the motor vehicle.

A hitch platform 22 is mounted on the transverse support member 12 at the transverse center thereof. The hitch platform 22 includes the upper platform plate 24, the lower platform plate 26 and the female hitch receptacle 28. The latter is adapted to receive the drawbar 30 which can be retained in the female hitch receptacle 28 by means of the hitch pin 32 which is secured in place by the hitch pin clip 34.

The two platform plates 24 and 26 are preferably of a generally triangular shape with the apex of each triangle extending rearwardly. The female hitch receptacle 28 is suitably secured, as by welding, between the platform plates. The upper platform plate 24 has a pair of holes 36 for receiving the ends of conventional safety chains.

Also forming a part of the hitch assembly 10 are the arms 38, only one of which is shown and which preferably are made of flat bar stock. Each of the arms 38 are secured at their after ends to the underside of the transverse support member 12 by the bolts 40, and they have means at their forward ends for securing to the opposite sides of the vehicle frame at a location substantially forward of the mountings of the end plates 14. In the illustrated embodiment of the invention the means shown is the bolt hole 42.

As can be seen particularly in FIG. 2, one of the characteristics of the present invention is the absence of any unnecessary protrusions below the undercarriage of the vehicle which will create problems relative to the hitch striking obstructions on the road surface. The transverse support member 12 is shown in FIG. 1 to be angularly displaced rearwardly at the transverse center thereof, and it is to be understood that this angular relationship between the opposite halves of the transverse support member can be varied in production to accommodate the undercarriage of the particular model of vehicle for which the hitch assembly is designed. The angle will be selected to provide minimum extension of the female hitch receptacle rearwardly of the tow vehicle so that when the vehicle is being driven up an incline or ramp, for example, there is a minimum opportunity for the female hitch receptacle and its drawbar to engage the road surface.

The hitch assembly 10 is also characterized by the light weight of the assembly commensurate with the loads that are transmitted and the construction and arrangement of the parts for most effectively distributing the load that is applied at the drawbar. When this hitch is used in conjunction with a conventional load equalizer, the flat bar or arm 38 on each side will be placed in tension to transmit a desired portion of the load to the front part of the frame thereby tending to equalize the load on the four wheels of the vehicle. Also, the arrangement whereby the tension arm and the end plate 14 at each side are secured to transmit torque applied to the transverse support member also affords effective distribution of the load. The hitch platform also provides a sturdy arrangement for transmitting the forces from the drawbar to the transverse support member for subsequent transmission to the frame of the vehicle. It is to be noted that the arms 38 are connected at their after ends between the transverse center and the outer ends of the transverse support member, and this arrangement also is effective for transmitting loads laterally to opposite sides of the vehicle when abnormally heavy loads occur to one side or the other of the hitch assembly.

Attention is now directed to FIGS. 4–6 for a description of another form of the present invention. The hitch assembly 44 has essentially the same transverse support member 46, hitch platform 48 and female hitch receptacle 50, as the corresponding parts 12, 22 and 28 of the previously described form of the invention, and therefore these parts will not be described again. The end plates 52, only one of which is shown, are similarly constructed, and only the illustrated end plate 52 will be described.

The end plate 52 has a plate portion 54 extending in a generally upright plane which contains a bore 56 into which the end of the tubular transverse support member 46 is fitted, and the latter is welded at the bore to the end plate 52. A flange portion 58 extends laterally from the upper edge of plate portion 54 and has fastening holes 60 and 62 for attachment purposes, each of which serves as a means for securing the hitch assembly 44 to a side of a vehicle frame. For reinforcement purposes, brackets 64 and 66 are mounted between plate and flange portions 54 and 58.

The arms 68, only one of which is shown, are modified in construction from the arms 38 of the previously described embodiment. Each arm 68 is made in two parts, a bracket 70 welded to the transverse support member 46 and a bar member 72 secured to the bracket 70 by the fastening bolts and nuts 74. The bracket 70 includes an upright portion 76 and a lateral flange 78. The lateral flange 78 is welded to the underside of transverse support member 46, and the rearward end of the upright portion 76 is similarly welded to transverse support member 46.

Thus, the form of the invention shown in FIGS. 4–6 includes the same structural arrangement as the form of the invention shown in FIGS. 1–3 and will accommodate loads in the same manner.

It is claimed:

1. A hitch assembly for mounting on the frame of a motor vehicle, comprising a tubular transverse support member, end plates mounted on opposite ends of said transverse support member, each plate extending upward above and forward of the transverse support member and having means at the upper and forward ends for mounting them on the sides of a motor vehicle frame with the transverse member positioned to the rear of and below said frame, tension arms secured at their after ends to the underside of said transverse support member between the opposite ends of the transverse center thereof, said tension arms being relatively long and having means at their forward ends for securing them to opposite sides of said vehicle frame forward of the mountings of said end plates, and a hitch platform including a female hitch receptacle mounted on said transverse support member at the transverse center thereof, said hitch platform having two generally triangular platform plates mounted on the upper and lower surfaces of said transverse support member with the apex of each triangle extending rearwardly, and said female hitch receptacle being secured between said platform plates and having an open end to the rear of said platform plates for receiving a drawbar.

2. The hitch assembly that is defined in claim 1, wherein safety chain holes are located in one of said platform plates on opposite sides of said female hitch receptacle.

3. The hitch assembly that is defined in claim 1, wherein each of said end plates has a tab deflected out of the plane of its plate to a position in engagement with said transverse support member, each said tab being integrally secured to said transverse support member.

4. The hitch assembly that is defined in claim 1, wherein each of said end plates has a bore therein, and the opposite ends of said transverse support member extend into the bores and are welded to the end plates.

5. A hitch assembly for mounting on the frame of a motor vehicle comprising a tubular transverse support member, end plates mounted on opposite ends of said transverse support member, each end plate extending above and forward of the transverse support member and having means at the upper and forward ends for mounting them on a motor vehicle frame with the transverse member positioned to the rear of and below said frame, a hitch platform including a female hitch receptacle mounted on said transverse support member at the transverse center thereof, said hitch platform having two generally triangular platform plates mounted on the upper and lower surfaces of said transverse support member with the apex of each triangle extending rearwardly, said female hitch receptacle being integrally secured between said platform plates and having an open end to the rear of said platform plates for receiving a drawbar, and arms secured at their after ends to the underside of said transverse support member between the ends and said transverse center thereof, said arms being relatively long and having means at their forward ends for securing them to opposite sides of said vehicle frame forward of the mountings of said end plates.

6. The hitch assembly that is defined in claim 5, wherein each of said end plates has a tab deflected substantially at a right angle to the plane of the plate, each said tab being welded to the wall of said tubular member.

7. The hitch assembly that is defined in claim 5, wherein said end plates have bores therein into which the ends of said tubular member are fitted, said end plates being welded to said tubular member at said bores.

8. The hitch assembly that is defined in claim 7, wherein said end plates have flanges projecting laterally from their upper edges for attachment to said motor vehicle frame.

9. The hitch assembly that is defined in claim 5, wherein said arms are bolted at their after ends to the underside of said transverse member.

10. The hitch assembly that is defined in claim 5, wherein each of said arms includes a bracket welded to said transverse support member adjacent to said hitch platform, and a bar bolted to said bracket and extending forward therefrom to be secured by said means at its forward end to said vehicle frame.

* * * * *